United States Patent [19]
Field et al.

[11] 3,970,606
[45] July 20, 1976

[54] N-VINYL LACTAM INTERPOLYMERS USEFUL AS THICKENING AGENTS

[75] Inventors: Nathan D. Field, Allentown; Earl P. Williams, Pen Argyl, both of Pa.

[73] Assignee: GAF Corporation, New York, N.Y.

[22] Filed: Aug. 31, 1973

[21] Appl. No.: 393,663

Related U.S. Application Data

[60] Division of Ser. No. 190,653, Oct. 19, 1971, abandoned, which is a continuation-in-part of Ser. No. 7,241, Jan. 30, 1970, abandoned.

[52] U.S. Cl. ................................ 526/260; 252/1; 260/29.6; 260/79.3 MU; 260/79.7 R; 260/80.3 N; 260/80.73; 526/264; 526/304; 526/347
[51] Int. Cl.² ..................... C08F 15/00; C08F 19/00
[58] Field of Search ............ 260/79.7, 80.72, 88.3 L

[56] References Cited
UNITED STATES PATENTS

| | | | |
|---|---|---|---|
| 2,980,634 | 4/1961 | Melamed | 260/2.1 |
| 3,397,192 | 8/1962 | Grasser | 260/80.72 |
| 3,423,367 | 1/1969 | Merijan | 260/66 |
| 3,686,150 | 8/1970 | Fein | 260/78.5 R |

*Primary Examiner*—Christopher A. Henderson
*Attorney, Agent, or Firm*—Walter C. Kehm; James N. Blauvelt

[57] ABSTRACT

An interpolymer useful in the thickening of aqueous acids comprising (A) about 20 to about 99.0 mole % acrylamide or N-vinyllactam, (B) about 0.5 to about 10 mole % long-chain containing vinyl monomer derivatives having the formula:

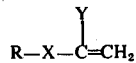

wherein
Y represents hydrogen, halogen, lower alkyl or phenyl
X represents oxygen, sulfur, carboxy or carbonamido; and
R represents a hydrocarbon group containing from about 6 to about 36 carbon atoms including normal chain alkyl, branched chain alkyl, cycloalkyl and alkylaryl and (C) about 0.5 to 79.5 mole % of a cationic moiety.

13 Claims, No Drawings

N-VINYL LACTAM INTERPOLYMERS USEFUL AS THICKENING AGENTS

This is a division of application Ser. No. 190,653, filed Oct. 19, 1971, and now abandoned, which application was a continuation-in-part of application Ser. No. 7,241, filed on Jan. 30, 1970, and now also abandoned.

The instant invention is directed to novel interpolymers which are useful as thickening agents in aqueous acid mediums. In particular, the instant invention is directed to interpolymers comprising N-vinyllactam or acrylamide, long-chain containing vinyl monomer units, and a cationic moiety.

The novel interpolymer compositions of the instant invention are of the type

A / B / C which have been found to be extremely useful as thickeners in aqueous systems and particularly useful in aqueous acidic mediums.

Component A of the subject interpolymer is derived from approximately 20.0 to approximately 99 mole % of either acrylamide or an N-vinyllactam having the following general configuration:

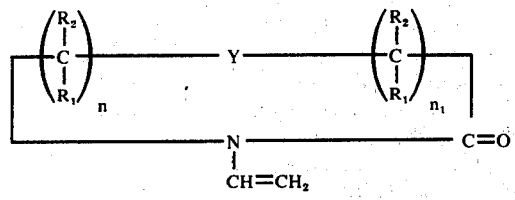

wherein $R_1$ and $R_2$ are each selected from the group consisting of hydrogen, and alkyl containing 1 to 2 carbon atoms, and Y is selected from the group consisting of oxygen, sulfur, sulfur dioxide, <$NR_1$, and

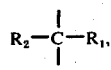

wherein not more than two of the groups $R_1$ and $R_2$ are alkyl groups. $n$ and $n_1$ may range from 0 to about 5 but only one of said $n$ or $n_1$ may be 0. Lactams of this type include materials such as the N-vinyl-2-pyrrolidone disclosed in U.S. Pat. Nos. 2,265,450; 2,335,454; and 3,097,087 the disclosures of which are incorporated herein by reference.

Further compounds which are useful as the N-vinyllactam component of the subject interpolymer compositions are those which may be prepared according to known processes by N-vinylation of the corresponding lactam at elevated temperatures. A process of this type is disclosed in U.S. Pat. No. 2,317,084 the disclosure of which is incorporated herein by reference. Exemplary of such compounds are the N-vinyl substituted derivatives of the following lactam:

3,3-dimethyl-2-pyrrolidone
4,4-dimethyl-2-pyrrolidone
3-ethyl-2-pyrrolidone
3,5-dimethyl-3-pyrrolidone
4-ethyl-2-pyrrolidone
5-ethyl-2-pyrrolidone
3-methyl-2-pyrrolidone
4-methyl-2-pyrrolidone
5-methyl-2-pyrrolidone
3,3,5-trimethyl-2-pyrrolidone
2-piperidone
5,6-dimethyl-2-piperidone
4-ethyl-2-piperidone
6-ethyl-2-piperidone
6-ethyl-3-methyl-2-piperidone
3-methyl-2-piperidone
4-methyl-2-piperidone
5methyl-2-piperidone
6-methyl-2-piperidone
6-methyl-2-piperidone
2-caprolactam
3,6-dimethyl-2-caprolactam
4,6-dimethyl-2-caprolactam
4,7-dimethyl-2-caprolactam
7,7-diethyl-2-caprolactam
3-ethyl-2-caprolactam
5-ethyl-2-caprolactam
6-ethyl-2-caprolactam
7-ethyl-2-caprolactam
4-ethyl-6-methyl-2-caprolactam
6-methyl-2-caprolactam
6-ethyl-4-methyl-2-caprolactam
3-methyl-2-caprolactam
4-methyl-2-caprolactam
5-methyl-2-caprolactam
6-methyl-2-caprolactam
2-oxazinidinone
5-ethyl-2-oxazinidinone
4,5-dimethyl-2-oxazinidinone
5,5-dimethyl-2-oxazinidinone
2,2'-dimethyl-4-oxothiazolidone
2-oxazolidinone
5-methyl-2-oxazolidinone
4-methyl-2-oxazolidinone
5-ethyl-2-oxazolidinone
4,5-dimethyl-2-oxazolidinone
3-morpholinone
5-methyl-3-morpholinone
5-ethyl-3-morpholinone
2-piperazonone
3,3-dimethyl-2-ketopiperazine
3-methyl-2-ketopiperazine
4-thiazolidone
2-methyl-4-thiazolidinone
2-thiazolidone
3-thiomorpholinone
2-pyrimidone
2-imidazolidones It is, of course, understood that mixtures of any of the above or similar N-vinylated lactams may be employed in combination or alone in the interpolymers of the instant invention. Preferably, however, N-vinyl-2-pyrrolidone is employed as the lactam component of the instant composition and will be referred to hereinafter as vinyl pyrrolidone.

The interpolymers may contain a minor amount, e.g., 1–5 mole % of part of the lactam. In place of the acrylonitrile, the various substituted acrylonitriles (e.g. methacrylonitrile, ethacrylonitrile, etc.) may be suitably used.

The second component of the subject interpolymer composition is a long-chain containing vinyl monomer unit derived from a vinyl monomer represented by the formula:

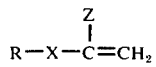

wherein

Z represents hydrogen, halogen, lower alkyl or phenyl;

X represents a simple chemical bond, oxygen, sulfur, carboxy, or carbonamido; and R represents the same or different hydrocarbon groups containing from about 6 to about 36 carbon atoms.

The hydrocarbon groups may be selected from normal-chain alkyl, branched-chain alkyl, cycloalkyl and alkylaryl.

It is to be noted that the preferred embodiments of the instant invention encompass those interpolymers wherein this particular moiety has as the R group a hydrocarbon group having 6 to 20 carbon atoms. It is further noted that the alkyl substituted moieties are preferred over the alkylaryl substituted ones, however, the alkyl aryl substituted units results in attaining highly satisfactory products. This particular component of the interpolymer is present in amounts of from about 0.5 to about 10 mole %.

As exemplary of those compounds employed as the second component of the novel interpolymers of the instant invention, there may be mentioned:

hexyl vinyl ether
heptyl vinyl ether
octyl vinyl ether
nonyl vinyl ether
decyl vinyl ether
hendecyl vinyl ether
dodecyl vinyl ether
tetradecyl vinyl ether
hexadecyl vinyl ether
octadecyl vinyl ether
myricyl vinyl ether
docosyl vinyl ether
cetyl vinyl ether
2-ethyl-1-butyl vinyl ether
2,6-dimethyl-4-heptyl vinyl ether
2,4,6,8-tetramethyl-1-nonyl vinyl ether
2-ethyl-1-decyl vinyl ether
isooctyl vinyl ether
2-ethylhexyl vinyl ether
isodecyl vinyl ether
tridecyl vinyl ether
cyclohexyl vinyl ether
decahydronaphthyl vinyl ether
hydroabietinyl vinyl ether
terpinyl vinyl ether
benzyl vinyl ether
β-phenylethyl vinyl ether
hydrocinnamyl vinyl ether
undecyl acrylate
lauryl acrylate
tridecyl acrylate
cetyl acrylate
octadecyl acrylate
myricyl acrylate
decyl acrylate
dodecylmethacrylate
cetyl methacrylate
octadecyl methacrylate
decyl α-ethyl acrylate
dodecyl-α-ethyl acrylate
tetradecyl α-ethyl acrylate
hexadecyl-α-ethyl acrylate
dodecyl α-chloroacrylate
tetradecyl-α-chloroacrylate
octadecyl-α-chloroacrylate
octadecyl α-bromoacrylate
hexyl α-phenyl acrylate
octyl α-phenyl acrylate
nonyl α-phenyl acrylate
decyl α-phenyl acrylate
dodecyl α-phenyl acrylate
decene-1
dodecene-1
hexadecene-1
octadecene-1
eicosene-1
vinyl laurate
vinyl palmitate
vinyl oleate
vinyl stearate
N-hexyl acrylamide
N-cetyl acrylamide
N-octadecyl acrylamide
N,N-dioctadecyl acrylamide
N-decyl methacrylamide
N,N-dioctyl methacrylamide
vinyl hexyl sulfide
vinyl dodecyl sulfide
vinyl tetradecyl sulfide
vinyl hexadecyl sulfide
vinyl octadecyl sulfide
N-vinyl-N-methyl lauramide
N-vinyl-N-ethyl myristamide
N-vinyl-N-methyl palmitamide
N-vinyl-N-methyl stearamide
N-vinyl-N-methyl oleamide
tetradecyl isopropenyl ether
hexadecyl isopropenyl ether
octadecyl isopropenyl ether
myricyl isopropenyl ether It is, of course, understood that the above-noted compounds may be employed either alone or in combination in the interpolymers of the instant invention.

The third component of the interpolymers of the instant invention, i.e., Component C, is a cationic moiety or its precursor derived from various monomers. This moiety is present in the interpolymer in amounts of from about 0.5 to about 79.5 mole %. The useful cationic moieties include compounds having the formula:

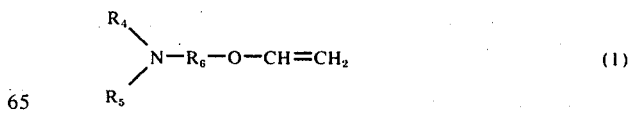

(1)

wherein $R_4$ and $R_5$ each designate a hydrocarbon group having 1 to 4 carbon atoms and when taken together with the nitrogen atom to which they are attached, a ring of not more than 6 carbon atoms, $R_6$ represents a hydrocarbon group having 2 to 4 carbon atoms; and/or $$CH_2=CHOCH_2CH_2N^+(CH_3)_3X^- \qquad (2)$$

wherein X represents halogen such as chlorine, bromine, or iodine; and/or

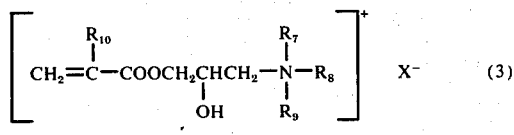   (3)

wherein $R_7$, $R_8$ and $R_9$ each designate methyl, ethyl or hydroxyethyl, $R_{10}$ is hydrogen or methyl, and X is halogen.

The novel interpolymers of the instant invention should have a relative viscosity of from 2 to about 30 as a 1% weight to volume solution in methanol. Preferably the interpolymers have a relative viscosity of 3 or above. The novel interpolymer composition of the instant invention as previously noted is extremely useful in the thickening of aqueous mediums. Such mediums include water, water-alcohol mixtures, aqueous acids and latices. The interpolymer of choice for a particular purpose may be selected depending upon its molecular weight as defined by its relative viscosity, the hydrophobic nature of the interpolymer as determined by the ratio and length of the long-chain moieties and other factors as will be evident to one skilled in the art.

The instant invention will now be further explained by the following more detailed examples thereof. It is to be noted, however, that the instant invention is not deemed as being limited thereby.

EXAMPLE 1

The following solutions were prepared:

Solution A (50% wt./vol. vinylpyrrolidone)
125.0 g. distilled vinylpyrrolidone made up to a total of
250.0 mls. with C.P. methanol in a volumetric flask Solution B (50% wt./vol. dimethylaminoethyl vinyl ether)
25.0 g. distilled dimethylaminoethyl vinyl ether made up to total of
50.0 mls. with C.P. methanol in a volumetric flask Solution C (5% wt./vol. catalyst solution)
1.250 g. Azobisisobutyronitrile made up to total of 25.0 mls. with C.P. methanol in a volumetric flask Polymerization tubes of approximately 100 ml. capacity with 8 inch extensions of 8 mm. tube were charged as follows:

TABLE 1

|  | Tube 1 | 2 | 3 | 4 | 5 |
|---|---|---|---|---|---|
| Solution A | 50 mls. | 45.0 mls. | 44.0 mls. | 42.5 mls. | 40.0 mls. |
| Solution B | none | 1.0 ml. | 1.0 ml. | 2.5 ml. | 2.5 mls. |
| Solution C | 0.5 ml. | 0.5 ml. | 0.5 ml. | 0.5 ml. | 0.5 ml. |
| Vinyl ether[3] | none | 2.0 g. | 2.5 g. | 2.5 g. | 3.75 g. |
| Composition (mole % of Charge | PVP[1]Control | 94.7 VP[2] | 93.7 VP | 90.6 VP | 88.1 VP |
|  |  | 3.3 VE[3]1618 | 4.3 VE 1618 | 4.3 VE 1618 | 6.6 VE 1618 |
|  |  | 2.0 DMAEVE[4] | 2.0 DMAEVE | 5.1 DMAEVE | 5.3 DMAEVE |

[1]PVP - polyvinylpyrrolidone
[2]VP - vinylpyrrolidone
[3]VE - vinyl ether (⅔ n-hexadecyl vinyl ether and ⅓ n-octadecyl vinyl ether)
[4]DMAEVE - dimethylaminoethyl vinyl ether The tubes were cooled to −75°C, evacuated by means of a vacuum pump to 20 mm., thawed and released with nitrogen then cooled to −75°C and evacuated to 20 mm. and sealed off. After thawing the tube contents to room temperature and shaking, the tubes were placed in a 65°C constant temperature bath for 19 hours.

The viscous products were each dissolved in 100 mls. C.P. methanol and the polymers precipitated by adding each to a mixture of 200 mls. heptane and 300 mls. diethyl ether.

The polymers were then dried in a vacuum oven at 40° to 45°C. and the weight, relative viscosity and equivalence/gram amine determined. The results are set forth in Table 2 below.

TABLE 2

| Tube | Relative Viscosity[1] | Dried Weight | Equivalence[2]/ gram amine |
|---|---|---|---|
| 1 | 4.216 | 24.6 | none |
| 2 | 4.065 | 22.2 | .00009 |
| 3 | 4.029 | 22.2 | .00009 |
| 4 | 3.642 | 22.1 | .00015 |
| 5 | 3.440 | 20.7 | .00015 |

[1]1% in methanol
[2]By titration

EXAMPLE 2

The following solutions were prepared:
Solution A:
50% wt./vol. 92 parts vinylpyrrolidone, 8 parts vinyl ether[1] comprising
92 grams distilled vinylpyrrolidone
8.0 grams vinyl ether[3]
0.1 gram azobisisobutyronitrile made up to a total of 200 mls. with C.P. methanol in a volumetric flask
Solution B:
50% wt./vol. 90 parts vinylpyrrolidone, 4 parts vinyl ether[1] and 6 parts 2-hydroxy-3-methacrylyloxypropyltrimethylammonium chloride
90.0 grams distilled vinylpyrrolidone
4.0 grams vinyl ether[1]
6.5 grams (91.8%) or (6.0 grams 100%) 2-hydroxy-3methacrylyloxypropyltrimethylammonium chloride 0.1 gram azobisisobutyronitrile made up to a total of 200 mls. with C.P. methanol in a volumetric flask

[1]Vinyl ether ( ⅔ n-hexadecyl vinyl ether and ⅓ n-octadecyl vinyl ether)

Polymerization tubes of approximately 100 ml. capacity with 8 inch extensions of 8 mm. tube were charged as follows:

TABLE 3

| Tube | 1 | 2 | 3 | 4 | 5 |
|---|---|---|---|---|---|
| Solution A | 70 ml. | 52.5 | 35.0 | 17.5 | none |
| Solution B | none | 17.5 | 35.0 | 52.5 | 70 ml. |
| Composition (mole %) of Charge | 99.2 VP[1] 0.8 VE[2] | 96.4 VP 2.9 VE 0.7 MA | 96.0 VP 2.6 VE 1.4 MA | 95.7 VP 2.1 VE 2.2 MA | 95.4 VP 1.6 VE 3.0 MA |

[1]VP -vinyl pyrrolidone
[2]VE -
[3]MA - 2-hydroxy-3-methacrylyloxypropyltrimethylammonium chloride The tubes were cooled to −75°C, evacuated by means of a vacuum pump to 20 mm. and released with nitrogen. This procedure was repeated two more times then the tubes were evacuated and sealed. After thawing and shaking the tubes were heated in a 65°C constant temperature bath for 18 hours.

The viscous products were each dissolved in 130 mls. C. methanol and precipitated by addition to 1 liter of diethyl ether.

The polymers were dried in a vacuum oven and analyzed with the following results:

TABLE 4

| Tube | Relative Viscosity[1] | Dried Weight | Equivalence[2]/ gram amine |
|---|---|---|---|
| 1 | 3.498 | 32.1 g. | none (control) |
| 2 | 6.583 | 34.3 g. | .00004 |
| 3 | 9.715 | 33.5 g. | .00005 |
| 4 | 12.661 | 34.0 g. | .00005 |
| 5 | 16.464 | 34.5 g. | .00017 |

[1]1% in methanol
[2]By titration

EXAMPLE 3

Solutions of the subject interpolymers in 15% HCl were found to have the following viscosities as determined with a Brookfield Model LVF viscometer.

TABLE 5

| Interpolymer | Rel. Visc. 1% MeOH | Polymer Conc. | CPS 6 rpm. |
|---|---|---|---|
| PVP[1] Control (Example 1-No. 1) | 4.21 | 4% | 70 |
| PVP Control (Example 1-No. 1) | 4.21 | 2% | 40 |
| 94.7 mole % VP[2]/3.3 mole % VE[3]/2.0 mole % DMAEVE[4](Example 1-No.2) | 4.06 | 4% | 46,000 |
| 94.7 mole % VP/ 3.3 mole % VE/ 2.0 mole % DMAEVE (Example 1-No. 2) | 4.06 | 3% | 31,000 |
| 94.7 mole % VP/ 3.3 mole % VE/ 2.0 mole % DMAEVE (Example 1-No. 2) | 4.06 | 2% | 8,500 |
| 93.7 mole % VP/ 4.3 mole % VE/ 2.0 mole % DMAEVE (Example 1-No. 3) | 4.02 | 4% | 83,500 |
| 93.7 mole % VP/ 4.3 mole % VE/ 2.0 mole % DMAEVE (Example 1-No. 3) | 4.02 | 3% | 50,000 |
| 93.7 mole % VP/ 4.3 mole % VE/ 2.0 mole % DMAEVE(Example 1-No. 3) | 4.02 | 2% | 8,000 |
| 90.6 mole % VP/ 4.3 mole % VE/ 5.1 mole % DMAEVE (Example 1-No. 4) | 3.64 | 4% | 18,500 |
| 90.6 mole % VP/ 4.3 mole % VE/ 5.1 mole % DMAEVE (Example 1-No. 4) | 3.64 | 3% | 12,500 |
| 90.6 mole % VP/ 4.3 mole % VE/ 5.1 mole % DMAEVE (Example 1-No. 4) | 3.64 | 2% | 7,900 |
| 88.1 mole % VP/ 6.6 mole % VE/ 5.3 mole % DMAEVE (Example 1-No. 5) | 3.44 | 4% | 55,600 |
| 88.1 mole % VP/ 6.6 mole % VE/ 5.3 mole % DMAEVE (example 1-No. 5) | 3.44 | 3% | 20,000 |
| 88.1 mole % VP/ 6.6 mole % VE/ 5.3 mole % DMAEVE (Example 1-No. 5) | 3.44 | 2% | 9,500 |
| 93.4 mole % VP/ 6.6 mole % VE Control | 3.58 | 2% | 6,100 |
| 90.9 mole % VP/ 9.1 mole % VE Control | 3.45 | 2% | 7,100 |
| 99.2 mole % VP/ 0.8 % VE (Example 2-No. 1) | 3.49 | 2% | 5,300 |
| 96.4 mole % VP/ 2.9 mole % VE/ 0.7 mole % G-MAC[5](Example 2-No. 2) | 6.58 | 2% | 11,400 |
| 96.0 mole % VP/ 2.6 mole % VE/ 1.4 mole % G-MAC (Example 2-No. 3) | 9.71 | 2% | 10,450 |
| 95.7 mole % VP/ 2.1 mole % VE/ 2.2 mole % G-MAC (Example 2-No. 4) | 12.66 | 2% | 8,500 |
| 95.4 mole % VP/ 1.6 mole % VE/ 3.0 mole % G-MAC (Example 2-No. 5) | 16.46 | 2% | 11,000 |
| 49.5 mole % 49.5 mole % 1.0 mole % | | | |

[1]PVP - polyvinyl pyrrolidone
[2]VP - vinyl pyrrolidone
[3]VE - vinyl ether (2/3 n-hexadecyl vinyl ether and 1/3 n-octadecyl vinyl ether)
[4]DMAEVE - dimethylaminoethyl vinyl ether
[5]G-MAC - 2-hydroxy-3-methacrylyloxypropyltrimethylamino chloride

What is claimed is:

1. A composition comprising an interpolymer consisting of components A, B and C:

COMPONENT A

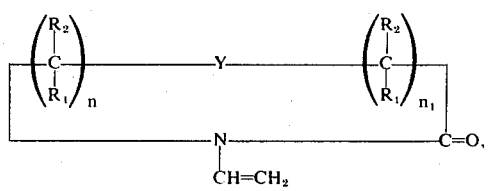

wherein $R_1$ and $R_2$ are each selected from the group consisting of hydrogen and alkyl containing 1 to 2 carbon atoms; Y is

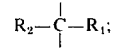

wherein not more than two of $R_1$ and $R_2$ are alkyl; and $n$ and $n_1$ have a value of from 0 to 5, with the proviso that only one of $n$ and $n_1$ are 0;

COMPONENT B

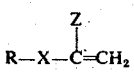

wherein Z is selected from the group consisting of hydrogen, lower alkyl, and phenyl; X is selected from the group consisting of oxygen and carboxy; and R represents the same or different hydrocarbon groups containing from about 6 to 36 carbon atoms selected from the group consisting of normal-chain alkyl, branched-chain alkyl, cycloalkyl and alkylaryl; and containing a member selected from the group consisting of

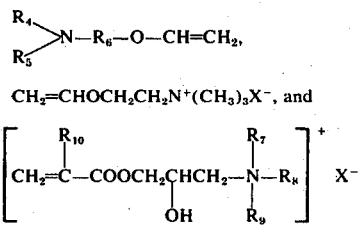

wherein $R_4$ and $R_5$ each designate a hydrocarbon radical having 1 to 4 carbon atoms and, when taken together with a nitrogen atom to which they are attached, a ring containing not more than 6 carbon atoms, and $R_6$ represents a hydrocarbon group having from 2 to 4 carbon atoms; X in member (2) represents halogen; $R_7$, $R_8$, and $R_9$ each designate methyl, ethyl, or hydroxyethyl radicals, $R_{10}$ is hydrogen or methyl, and X in member (3) is halogen; said interpolymer comprising from about 20 to about 99 mole % of Component A, from about 0.5 to about 10 mole % of Component B, and from about 0.5 to about 79.5 mole % of Component C.

2. The interpolymer of claim 1 wherein Component A is N-vinyl-2-pyrrolidone.

3. The interpolymer of claim 1 wherein in Component B, R is a hydrocarbon group having from 6 to 20 carbon atoms.

4. A composition according to claim 1 wherein $R_1$, $R_2$, and Z are each hydrogen.

5. A composition according to claim 4 wherein the X moiety defining Component B is oxygen.

6. A composition according to claim 4 wherein the X moiety defining Component B is carboxy.

7. A composition according to claim 5 wherein Component C is moiety (1) thereof.

8. A composition according to claim 6 wherein Component C is moiety (1) thereof.

9. The interpolymer of claim 1 wherein in Component B, R is alkyl having from 6 to 20 carbon atoms.

10. The interpolymer of claim 1 containing Component C (1).

11. The interpolymer of claim 1 containing Component C (2).

12. The interpolymer of claim 1 containing Component C (3).

13. The interpolymer of claim 1 having a relative viscosity of from 2 to about 30 as a 1% weight/volume solution in methanol.

* * * * *